United States Patent
Rainisto

(10) Patent No.: US 8,135,779 B2
(45) Date of Patent: Mar. 13, 2012

(54) METHOD, SYSTEM, APPARATUS, AND SOFTWARE PRODUCT FOR FILTERING OUT SPAM MORE EFFICIENTLY

(75) Inventor: Jonni Rainisto, Tampere (FI)

(73) Assignee: Nokia Corporation, Espoo (FI)

( * ) Notice: Subject to any disclaimer, the term of this patent is extended or adjusted under 35 U.S.C. 154(b) by 934 days.

(21) Appl. No.: 11/147,981

(22) Filed: Jun. 7, 2005

(65) Prior Publication Data

US 2006/0277264 A1    Dec. 7, 2006

(51) Int. Cl.
G06F 15/16    (2006.01)
G06F 15/173   (2006.01)

(52) U.S. Cl. .................. 709/206; 709/223; 709/224

(58) Field of Classification Search .......... 709/223–225, 709/204–206
See application file for complete search history.

(56) References Cited

U.S. PATENT DOCUMENTS

| | | | |
|---|---|---|---|
| 6,732,157 B1 | 5/2004 | Gordon et al. | 709/206 |
| 6,732,254 B1 * | 5/2004 | Slivkoff et al. | 712/37 |
| 7,293,063 B1 * | 11/2007 | Sobel | 709/206 |
| 7,543,053 B2 * | 6/2009 | Goodman et al. | 709/224 |
| 7,739,341 B1 * | 6/2010 | Sobel | 709/206 |
| 2002/0147780 A1 * | 10/2002 | Liu et al. | 709/206 |
| 2003/0225841 A1 * | 12/2003 | Song et al. | 709/206 |
| 2004/0117648 A1 * | 6/2004 | Kissel | 713/200 |
| 2004/0215977 A1 * | 10/2004 | Goodman et al. | 713/201 |
| 2005/0050150 A1 * | 3/2005 | Dinkin | 709/207 |
| 2005/0071432 A1 * | 3/2005 | Royston, III | 709/206 |
| 2005/0081059 A1 * | 4/2005 | Bandini et al. | 713/201 |
| 2005/0198159 A1 * | 9/2005 | Kirsch | 709/206 |
| 2006/0020678 A1 * | 1/2006 | Kessler et al. | 709/207 |
| 2006/0041622 A1 * | 2/2006 | Qutub et al. | 709/206 |
| 2006/0168031 A1 * | 7/2006 | Cai et al. | 709/206 |
| 2006/0168066 A1 * | 7/2006 | Helsper et al. | 709/206 |
| 2007/0250644 A1 * | 10/2007 | Lund et al. | 709/245 |
| 2008/0133682 A1 * | 6/2008 | Chadwick et al. | 709/206 |

OTHER PUBLICATIONS

4Sure Hosting: http://www.4surehosting.co.uk/information/whitelist_blacklist.shtml (downloaded Apr. 15, 2005), via the Internet.
"The Next Step in the Spam Control War: Greylisting", E. Harris, http://projects.puremagic.com/greylisting/ via the Internet.
Apache SpamAssasin: http://wiki.apache.org/spamassisin/, via the Internet.

* cited by examiner

Primary Examiner — Joshua Joo
(74) Attorney, Agent, or Firm — Ditthavong Mori & Steiner, P.C.

(57) ABSTRACT

A method, network element, system, and software product are presented for differentiating spam from email so that the spam can be deleted, or placed in a separate location, or identified as spam. Email is received at a server, and the email is initially filtered to differentiate at least part of the spam from the other email. Then the filter is improved, for example by using an updated database to identify spam. Subsequently, the email is intermediately filtered to differentiate further spam at least once before a user device attempts to access the email. Some of the further spam was overlooked by the initial filtering, but not overlooked by the intermediate filtering.

24 Claims, 3 Drawing Sheets

METHOD, SYSTEM, APPARATUS, AND SOFTWARE PRODUCT FOR FILTERING OUT SPAM MORE EFFICIENTLY

FIELD OF THE INVENTION

The present invention relates to electronic communication such as email, and more particularly to prevention of unwanted electronic communication.

BACKGROUND OF THE INVENTION

Spam is an unfortunate byproduct of email communication which is a type of communication that has become commonplace during the past decade. The term "spam" often refers to unsolicited commercial email (UCE) and unsolicited bulk email (UBE). In the context of the present invention, spam refers generally to these and other types of unsolicited electronic communications. Usually, spam is sent to multiple recipients, and, because the sender need not pay any postage, there are few disincentives to prevent the sender from sending the spam to hundreds, thousands, or even millions of recipients who usually do not want to receive the spam.

Various methods have been developed for preventing spam, or for at least reducing the amount of unwanted spam that a person receives. Whitelisting, blacklisting, and greylisting are three of those methods.

A whitelist is a list of email addresses from which a person wishes to receive communications, without those communications being tagged as spam, tagged as unsolicited, tagged as dangerous, or having the content blocked due to the nature of that content. An individual email recipient can add individual email addresses to a whitelist, so that whenever an email is received from a sender, it is then checked against the whitelist to see if the recipient has established any rule about that particular sender's email address. If a rule to whitelist the email address exists, then the email is allowed to pass into the recipient's emailbox without passing through the server-wide spam/content detection and tagging system, but if the email address does not exist in the recipient's whitelist (or if a whitelist does not exist) then the incoming email message is checked as usual by the tagging system so that action will be performed on the email if appropriate.

In contrast to a whitelist, a blacklist is a list of email addresses from which a recipient does not want email to be allowed to pass freely through the tagging system, and instead wants to have the email tagged or blocked depending upon the email's content. This is not a deletion system, and simply ensures that any emails that appear within a recipient's blacklist are tagged or blocked if appropriate. Tagged emails can then be handled according to particular rules established by the recipient or by another entity (such as the internet service provider, ISP).

In contrast to whitelisting and blacklisting, greylisting is a method of blocking significant amounts of spam at the emailserver level, but without resorting to heavy statistical analysis or other error-prone approaches. Consequently, greylisting implementations may minimize or even decrease network traffic and processor load on an emailserver. Although greylisting is effective by itself, it performs best when used in conjunction with other types of spam prevention. Greylisting relies on the fact that most spam sources do not behave in the same way as other email systems. The term greylisting is meant to describe a general method of blocking spam based upon the behavior of the sending server, rather than based upon the content of the messages. Greylisting does not refer to any particular implementation of these methods, so there is no single greylisting product. A preferred implementation of greylisting typically looks at three pieces of information: the IP address of the host attempting the delivery, the envelope sender address, and the envelope recipient address. If this triplet has never been seen before, then delivery is refused while providing a temporary failure code. Any well-behaved message transfer agent (MTA) will attempt retries if given an appropriate temporary failure code for a delivery attempt. Unlike an MTA, spammers usually adopt the "fire-and-forget" methodology. Thus, greylisting makes it likely that only non-spam will arrive at a recipient address.

Other methods for dealing with spam are known in the art. Spamassassin is a mature, widely-deployed open source project that serves as an email filter to identify spam. Spamassassin uses a variety of mechanisms including header and text analysis, Bayesian filtering, domain name system (DNS) blocklists, and collaborative filtering databases. Spamassassin runs on a server, and filters spam before it reaches a recipient's emailbox. Other prior art methods for dealing with spam include email confirmation, as well as email filters that are based upon header analysis and/or text analysis, which can be used in possible combination with blacklists, whitelists, greylists, and/or spam-tracking databases.

A typical spam patent is Gordon et al. (U.S. Pat. No. 6,732,157), which says that, after receiving electronic mail messages, the electronic mail messages that are unwanted are filtered utilizing a combination of techniques including compound filters, paragraph hashing, and Bayes rules. It is also known to forward all incoming email to another (third) address, which is a filtering spam sender address; a master-junk mail file is used to filter incoming email against a list of known "spammers."

Normally, the point in time when spam filters like spamassassin check whether the sender and/or the sent email qualifies as spam is when the email is received at the server side. Some email clients also filter spam when a user device accesses the email from the server, which is efficient at some level (perhaps about 90% or so), but that still does not block all email that was not updated to global blocking lists such as Razor.

Currently, prior art does not update filters between receiving and accessing email. Prior art can check the mail when accessing, but that check is done at the client side which does not get updated databases from the network. Thus, filtering in response to a user access attempt typically utilizes only a client-side blacklist, rather than automatically fetching updated databases from the network. So, if the spam mail gets through the initial check when mail is received on the server side, that spam email will most likely also get through the check when a client accesses the mail. Thus, prior art checking does not necessarily improve the detection of the spam between receiving the mail at the server and when the clients fetches/accesses the mail from the servers. Even if the latter checking were as thorough as the initial checking, it would still cause very high filter processor demand at peak email access times (e.g. Monday morning).Regarding Razor, that global blocking list is a collaborative spam-tracking database that works by taking a signature of spam messages. Since spam typically operates by sending an identical message to hundreds of people, Razor short-circuits spammers by allowing the first person to receive a spam to identify that spam in the database—at which point all other recipients will automatically block that particular spam message.

Thus, even using a method like spamassassin, spammers are able to send their email to end-users for perhaps an hour or so, before databases like Razor are updated to detect that email message as spam. The problem is how to get rid of the spam that has already been received and missed by the filters during that initial hour or so. Different internet service providers (ISPs) use spamassassin and/or other email filters, which are based on header analysis, text analysis, blacklists, whitelists, greylists, spam-tracking databases, and the like. But, those anti-spam methods have in common that they check email when it is received, or when it is bounced (e.g. in the case of some greylisting methods).

SUMMARY OF THE INVENTION

According to the method, apparatus, system, and software product of the present invention, spam is more efficiently differentiated from email so that the spam can be deleted, or placed in a separate location, or identified as spam. When email is received at a server, the email is initially filtered to differentiate at least part of the spam from the other email. Then the filter is improved, for example by using an updated database to identify spam. This filter improvement can utilize results of the initial filtering, in addition to other filtering of email directed at other email recipients. Subsequent to filter improvement, the email is intermediately filtered to differentiate further spam at least once before a user device attempts to access the email. In contrast to the present invention, the prior art does not update the filters between receiving and accessing the e-mails Thus, further spam that was overlooked by the initial filtering will not be overlooked by the intermediate filtering. The email can also be filtered a final time when a user device attempts access. The intermediate filtering can reduce the amount of email that needs to be filtered during the final filtering, and thus can reduce processing demand at peak email access times, such as Monday mornings. Some email clients filter mail using their own black list, when fetching/accessing the mail, but this is distinct from the normal filtering system that an ISP or server side uses. If a user side email client would have network updates, it could improve the filtering and would lower the CPU load of the server, since then the processing load would go to the end user's machine. However, for a user-friendly email experience, intermediate filtering is desirable, because the end user will not have to use any special email client.

Thus, the present invention relates to eliminating spam email that has already been received and missed by usual spam email filters. For example, during a holiday from work, a user can receive spam email to his or her email inbox that has passed by the spam filters. When the filters are updated, the spam emails that are already in the user's inbox are also scanned and filtered according to this new, updated version of the filters, according to the present invention.

Advantages of the invention are as follows. The end user receives less spam and does not have to worry about received spam email when coming back to work from a vacation. The email also arrives faster to the end user, when compared with the greylisting method, because there is no need to bounce anything back to the sender. Of course, the present invention can be used not only when the user goes on vacation, but during any interval when the user is not checking the user's email. This new invention can also be used in combination with the existing methods, such as whitelisting, greylisting, and blacklisting, spamassassin, and the like.

The novel features of this invention include scanning the emails, for example once in an hour, and updating the filters. For instance, spamassassin can be used to check already-received emails from the server's inbox, in order to scan every email once an hour, or to scan every unread email once an hour. This way, when blacklists and/or global internet-based spam-tracking databases are updated after initial spams from a spammer, the present invention detects emails from that spammer that previously got through the filters. The spam is then marked and moved to a spam folder. This new invention is especially useful for ISPs, and would decrease the spam amounts that the end user would see. The invention also reduces filtering processor demand at peak email access times, by lessening the amount of email that is filtered at those peak email access times.

Although the present invention involves intermediate filtering between email receipt and email access, the invention also includes the idea of thorough filtering of at least some email at the access stage. This involves, for example, blacklist updates from the network immediately before accessing/fetching the mail from server.

DETAILED DESCRIPTION OF THE INVENTION

Figure 1:
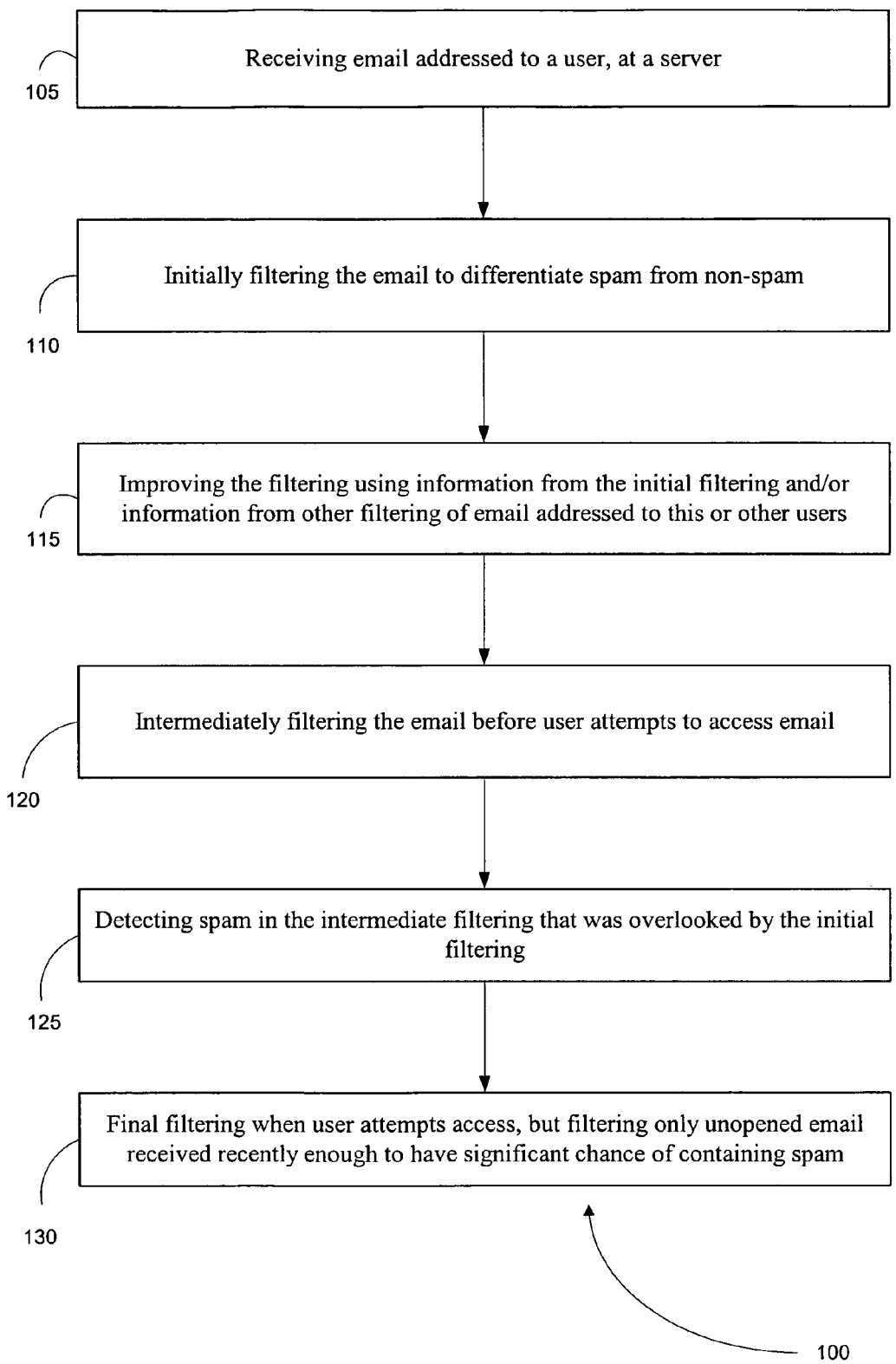
FIG. 1 is a flow chart showing an embodiment of the method of present invention.

According to an embodiment of the present invention, a prerequisite is incoming email that is filtered with spamassassin or some other filter. Then, a short scanner would periodically (e.g. once an hour) read a user's inboxes, and optionally only scan unread emails, or a certain amount of newest emails, or all emails in the user's inbox. The scanner could pass over emails on a whitelist, and only select other incoming emails. Each of the emails selected by the scanner would be sent again to the filter such as spamassassin, which uses Razor or some other global blocking lists, and if the selected email this time matches any item on the updated blocking lists, then the selected email is marked as spam and/or moved from the inbox to the spam folder (some ISP's keep the spam in the same folder with the subject line marked as spam instead of moving the spam to a separate folder).

Thus, the end user receives less spam and does not have to worry about seeing spam on Monday morning when opening the email box, after being away for the weekend, since the spam that normally would have accumulated during the weekend has most likely been filtered with higher success than with filtering upon arrival only. Likewise, the spam that has arrived during a weeknight is periodically filtered to provide a better spam-killing success rate, and the end user has in the morning a better email-opening experience.

Another advantage compared to the greylist approach is that email arrives much faster to end users, and is not bounced back to senders as with greylists, although greylists potentially reach about the same success rate as the periodical scanning of the present invention.

The present invention could require the ISP to have more processor power for filtering, compared to the traditional way which only filters incoming emails when they arrive. This is because the same email can be scanned multiple times in hopes that blocking rules and lists have been updated. One way to compensate for this need for processor power would be to only do spam filtering when the user attempts to open an email, but then the results of the filtering could not be used to detect other spam, until the user attempts to open the emails. Also, if the filtering is postponed until the user attempts to access email, then it may be necessary to reject an important and/or desired e-mail when storage capacity is filled to the maximum with the unwanted spam email containing advertisements.

At the email server side, spam filters like spamassassin are sometimes used when the email is received at the server side. Also, spam can be filtered when the user accesses the email from the server; some prior art email clients only have ability to filter email when they access the email from the server, and the majority of email clients do not even have that ability yet.

Intermediate filtering is desirable not only because it can reduce email storage requirements at the server, but also because it can reduce surges in filtering requirements that occur when many people go to work in the morning, especially Monday morning.

Let us now consider the figures. Various embodiments of the present invention are illustrated therein, to help more fully explain the inventive concept and how it can be put into practice.

FIG. 1 shows a method 100 that begins by receiving 105 email addressed to a user. Then initial filtering 110 occurs, to differentiate spam from non-spam. Subsequently, the filtering is improved 115, and then intermediate filtering 120 is performed using those improvements, in order to detect spam 125 that was overlooked (e.g. not recognized as such) during the initial filtering or during a prior intermediate filtering. Lastly, a final filtering may occur 130 when there is a user access attempt. This final filtering is not essential, and instead the email client side may attempt to filter internally, using the client device (e.g. mobile phone). If the server side would issue one more filter round upon a user access attempt, that could delay the response time for a second or so, so it might actually detract from the end user experience.

Preferably, the step of intermediately filtering 120 is performed at a time (or at multiple different times) when filter processing demand is below a filter processing power threshold, for example in the hours before dawn. The step of intermediately filtering can be done gradually over time, in order to minimize processor demand (i.e. maintain the processor demand below a certain threshold). If all email were instead filtered upon user access, that would have to be done very quickly in order to enhance the user experience, and also many users could access at the same time which would further increase processor demand.

Each of the intermediate filterings 120 only filters a portion electronic mail (e.g. including only unopened mail) that was received at the server recently enough, so as to substantially avoid redundant effective filtering. Thus, for example, if an email was received and initially filtered at 10 PM, then it would be appropriate to intermediately filter that email at midnight, but intermediately filtering that email again at 2:00 AM could be redundant, because the filter improvements between 10:00 PM and midnight would be adequate to cover email received at 10:00 PM. Thus, if intermediate filtering occurs at 2:00 AM, then that intermediate filtering would only filter unopened email received later (e.g. after 11:00 PM). Of course, redundant filtering does not adversely affect the ultimate disposition of spam email, but it does needlessly consume filter processing power.

Furthermore, each of the intermediate filterings 120 only filters a portion of unopened electronic mail that was received and initially filtered at the server a long enough time ago, so as to substantially ensure that the intermediate will be substantially improved over the initial filtering. In other words, referring to the example already described, the intermediate filtering at 2:00 AM would filter unopened email received from 11:00 PM to 1:00 AM. This is because email received at the server between 1:00 AM and 2:00 AM might not be fully covered by filter improvements performed by 2:00 AM.

When the user attempts to access email, for example at 9:00 AM, then there can be a final filtering of the email, in response to the user device attempting to access the email. Of course, this final filtering will not filter email already identified as spam by the intermediate filterings, and therefore filer processing demand at 9:00 AM will not be as great as it would be according to the prior art. Additionally, the final filtering can also omit email that was already emailed hours earlier, because filtering that email could be redundant.

Figure 2:
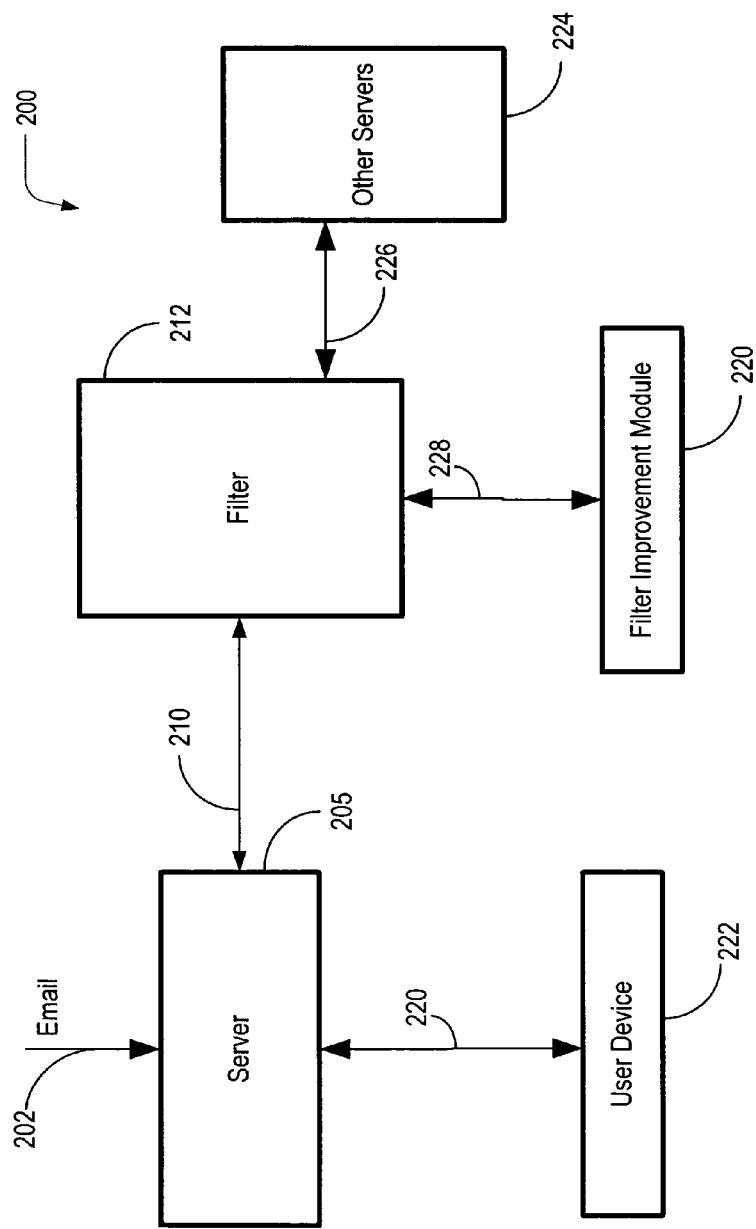
FIG. 2 is a block diagram showing an embodiment of the system of present invention.

Let us turn now to the system 200 shown in FIG. 2, for differentiating spam from non-spam. The server 205 is for receiving email 202. A filter 212 is responsive on the line 210 to receipt of the email, and the filter initially filters the email to differentiate at least part of the spam from the non-spam. A filter improvement module 220 is interactively connected to the filter 212 on the line 228, and the filter improvement module 220 is for improving the filter over time, in response to a filter improvement signal along the line 228. That filter improvement signal originates from information fed to the filter not just from the server 205 along the line 210, but also from other servers 224 along the line 226. A user device 222 is for accessing the email from the server 205 along the line 220.

The filter 212 is also for intermediately filtering the email to differentiate further spam, before the user device 222 attempts to access the email. At least part of that further spam was overlooked by the initial filtering.

Figure 3:
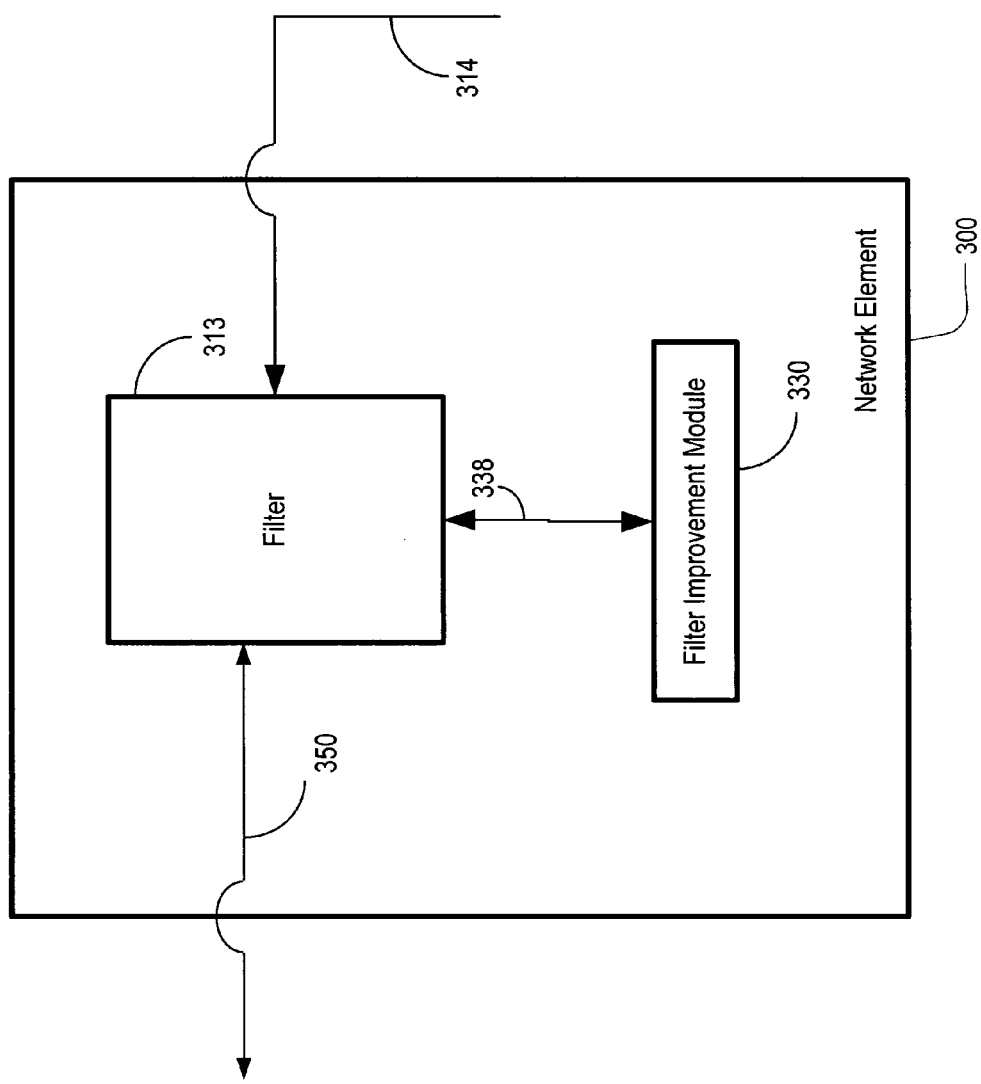
FIG. 3 is a block diagram showing an embodiment of the network element of present invention.

Turning now to the network element 300 shown in FIG. 3, this network element is for differentiating spam from other email received by a server. The network element 300 comprises a filter 313, responsive to receipt of email along line 350, the filter being for initially filtering the email to differentiate at least part of the spam from the non-spam. The network element also includes a filter improvement module 330, for improving the filter in response to a filter improvement signal along line 338. This filter improvement signal includes not just email information received along line 350, but also other email information related to other users, received along line 314.

The filter 313 is also for intermediately filtering the email to differentiate further spam at least once before the network element 300 detects an attempt to access the email by a user device. At least part of the further spam was overlooked by the initial filtering.

It is to be understood that all of the present figures, and the accompanying narrative discussions of best mode embodiments, do not purport to be completely rigorous treatments of the method, system, network element, and software product under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

What is claimed is:

1. A method comprising:
   causing, at least in part, reception of at least one email at a server,
   initially filtering the at least one email to identify whether the at least one email is a spam email or a non-spam email, the non-spam email being accessible to a user device;

improving the filtering by updating a spam filter;
performing at least one intermediate filtering on the initially identified non-spam email, to further identify whether the initially identified non-spam email is a spam email or a non-spam email using the updated spam filter, at least once before detecting that the user device attempts to access the initially identified non-spam email, a further identified spam email being overlooked by the initial filtering; and
finally filtering the initially or further identified non-spam email in response to the user device attempting to access the initially or further identified non-spam email, while omitting final filtering of the initially or further identified non-spam email, if the spam filter is not updated since the initial filtering or a most recent intermediate filtering,
wherein the intermediate filtering only occurs if there are more than a predetermined amount of initially or further identified non-spam emails to be filtered, or if an email storage threshold is reached at the server.

2. The method of claim 1, wherein the intermediately filtering is performed while maintaining filter processing demand below a filter processing power threshold.

3. The method of claim 1, wherein each of the at least one intermediate filtering only filters a portion of the initially identified non-spam email, after improving the filtering.

4. The method of claim 1, wherein the intermediate filtering occurs if available processing capability exceeds a predetermined threshold.

5. The method of claim 1, wherein the initial filtering and the intermediate filtering have at least one filtering technique in common.

6. The method of claim 5, wherein the at least one filtering technique is updated between said initial filtering and at least one of said intermediate filtering, at least by using an updated database.

7. The method of claim 6, wherein the updated database is developed at least partly by using information gleaned from the initial filtering.

8. The method of claim 1, wherein the initial filtering and each of said at least one intermediate filtering are performed at different time points separated by a predetermined minimum time period.

9. The method of claim 1, wherein the initially identified non-spam email remains accessible to the user device at least until the intermediate filtering.

10. The method of claim 1, wherein each of the at least one intermediate filtering only filters the initially or further identified non-spam mail that is unopened.

11. An apparatus comprising:
at least one processor;
a filter, responsive to receipt of at least one email, configured to initially filter the at least one email to identify whether the at least one email is a spam email or a non-spam email, the non-spam email being accessible to a user device; and
a filter improvement module, configured to update, via the at least one processor, the filter in response to a filter improvement signal,
wherein the filter is also configured to perform at least one intermediate filtering on the initially identified non-spam email, to further identify whether the initially identified non-spam email is a spam email or a non-spam email using the updated filter, at least once before detecting that the user device attempts to access the initially identified non-spam email by the user device, a further identified spam email being overlooked by the initial filtering,
wherein the filter is further configured to finally filter the initially or further identified non-spam email in response to the user device attempting to access the initially or further identified non-spam email, while omitting final filtering of the initially or further identified non-spam email, if the filter is not updated since the initial filtering or a most recent intermediate filtering, and
wherein the intermediate filtering only occurs if there are more than a predetermined amount of initially or further identified non-spam emails to be filtered, or if an email storage threshold is reached.

12. The apparatus of claim 11, wherein the filter is configured to postpone the intermediate filtering in response to a threshold signal indicating that filter processing demand is above a filter processing power threshold.

13. A non-transitory computer readable storage medium carrying one or more sequences of one or more instructions which, when executed by one or more processors, cause an apparatus to at least perform the following steps:
receiving at least one email,
initially filtering the at least one email to identify whether the at least one email is a spam email or a non-spam email, the non-spam email being accessible to a user device;
improving the filtering by updating a spam filter;
performing at least one intermediate filtering on the initially identified non-spam email, to further identify whether the initially identified non-spam email is a spam email or a non-spam email using the updated spam filter, at least once before detecting that the user device attempts to access the initially identified non-spam email, a further identified spam email being overlooked by the initial filtering; and
finally filtering the initially or further identified non-spam email in response to the user device attempting to access the initially or further identified non-spam email, while omitting final filtering of the initially or further identified non-spam email, if the spam filter is not updated since the initial filtering or a most recent intermediate filtering,
wherein the intermediate filtering only occurs if there are more than a predetermined amount of initially or further identified non-spam emails to be filtered, or if an email storage threshold is reached.

14. The non-transitory computer readable storage medium of claim 13, wherein the intermediately filtering is performed while maintaining filter processing demand below a filter processing power threshold.

15. The non-transitory computer readable storage medium of claim 13, wherein the apparatus performs each of the at least one intermediate filtering by only filtering a portion of the initially identified non-spam email, after improving the filtering.

16. The non-transitory computer readable storage medium of claim 13, wherein the initial filtering and the intermediate filtering have at least one filtering technique in common.

17. The non-transitory computer readable storage medium of claim 13, wherein the initial filtering and each of said at least one intermediate filtering are performed at different time points separated by a predetermined minimum time period.

18. The non-transitory computer readable medium storage of claim 13, wherein the apparatus performs each of the at least one intermediate filtering by filtering only the initially or further identified non-spam mail that is unopened.

19. An apparatus comprising:
at least one processor; and
at least one memory including computer program code,
the at least one memory and the computer program code configured to, with the at least one processor, cause the apparatus to perform at least the following,
receive at least one email;
initially filter the at least one email to identify whether the at least one email is a spam email or a non-spam email, the non-spam email being accessible to a user device, improve the filtering by updating a spam filter;
perform at least one intermediate filtering on the initially identified non-spam email, to further identify whether the initially identified non-spam email is a spam email or a non-spam email using the updated spam filter, at least once before detecting that the user device attempts to access the initially identified non-spam email, a further identified spam email being overlooked by the initial filtering; and
finally filter the initially or further identified non-spam email in response to the user device attempting to access the initially or further identified non-spam email, while omitting final filtering of the initially or further identified non-spam email, if the spam filter is not updated since the initial filtering or a most recent intermediate filtering,
wherein the intermediate filtering only occurs if there are more than a predetermined amount of initially or further identified non-spam emails to be filtered, or if an email storage threshold is reached.

20. The apparatus of claim 19, wherein the apparatus performs each of the at least one intermediate filtering by only filtering a portion of the initially identified non-spam email, after improving of the filter.

21. The apparatus of claim 19, wherein the initial filtering and the intermediate filtering have at least one filtering technique in common.

22. The apparatus of claim 19, wherein the initial filtering and each of said at least one intermediate filtering are performed at different time points separated by a predetermined minimum time period.

23. The apparatus of claim 19, wherein the apparatus is further caused to postpone the intermediate filtering in response to a threshold signal indicating that filter processing demand is above a filter processing power threshold.

24. The apparatus of claim 19, wherein the apparatus performs each of the at least one intermediate filtering by filtering only the initially or further identified non-spam mail that is unopened.

* * * * *